(12) United States Patent
Jing et al.

(10) Patent No.: US 9,612,462 B2
(45) Date of Patent: Apr. 4, 2017

(54) LIQUID CRYSTAL DISPLAY PANEL POOR ALIGNMENT REPAIRING APPARATUS

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yangkun Jing, Beijing (CN); Junwei Li, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/098,376

(22) Filed: Apr. 14, 2016

(65) Prior Publication Data

US 2016/0341986 A1 Nov. 24, 2016

(30) Foreign Application Priority Data

May 19, 2015 (CN) .......................... 2015 1 0257030

(51) Int. Cl.
*G02F 1/13* (2006.01)
*G02F 1/1333* (2006.01)

(52) U.S. Cl.
CPC .......... *G02F 1/1309* (2013.01); *G02F 1/1303* (2013.01); *G02F 1/133351* (2013.01)

(58) Field of Classification Search
CPC ................. G02F 1/1309; G02F 1/1303; G02F 1/133351; H01J 9/46
See application file for complete search history.

(56) References Cited

U.S. PATENT DOCUMENTS

| 7,954,993 B2 * | 6/2011 | Hewinson | G01J 1/4257 136/203 |
| 2003/0043337 A1 * | 3/2003 | Takabayashi | G02F 1/1333 349/187 |
| 2015/0003494 A1 * | 1/2015 | Yokoyama | G01N 1/44 374/55 |

* cited by examiner

*Primary Examiner* — Anne Hines
*Assistant Examiner* — Jose M Diaz
(74) *Attorney, Agent, or Firm* — Bakerhostetler LLP

(57) ABSTRACT

A liquid crystal display panel poor alignment repairing apparatus includes: a shell including an accommodation space which includes a separate first chamber and a separate second chamber; and a temperature control device, which is to control temperatures in the first chamber and the second chamber in such a manner of heating a to-be-repaired liquid crystal display panel in the first chamber and simultaneously cooling a to-be-repaired liquid crystal display panel in the second chamber.

20 Claims, 5 Drawing Sheets

US 9,612,462 B2

LIQUID CRYSTAL DISPLAY PANEL POOR ALIGNMENT REPAIRING APPARATUS

CROSS-REFERENCE TO RELATED APPLICATION

This application claims a priority to Chinese Patent Application No. 201510257030.5 filed on May 19, 2015, the disclosures of which are incorporated in their entirety by reference herein.

TECHNICAL FIELD

The present disclosure relates to the field of display manufacturing technology, and in particular to a liquid crystal display panel poor alignment repairing apparatus.

BACKGROUND

An existing method for repairing Zara Domain caused by poor alignment adopts a separate heating device and a separate cooling device. Separate rooms are required for separately heating or cooling the liquid crystal display panel, respectively. Further, a large amount of power is consumed by heating and cooling. After being heated or cooled, an expensive conveying device is required to convey the liquid crystal display panel, and thus large space is occupied.

SUMMARY

In order to solve the above technical problem, one embodiment of the present disclosure provides a liquid crystal display panel poor alignment repairing apparatus, which can simultaneously provide heating function and cooling function.

In order to achieve the above object, technical solutions adopted in the present disclosure are as follow.

A liquid crystal display panel poor alignment repairing apparatus includes: a shell including an accommodation space which includes a separate first chamber and a separate second chamber; and, a temperature control device, which is to control temperatures in the first chamber and the second chamber in such a manner of heating a to-be-repaired liquid crystal display panel in the first chamber and simultaneously cooling a to-be-repaired liquid crystal display panel in the second chamber.

Further, the apparatus further includes a transmission device for transferring one to-be-repaired liquid crystal display panel which has been heated in the first chamber to the second chamber.

Further, the temperature control device includes a semiconductor structure which provides heating function and cooling function simultaneously; the semiconductor structure includes a hot end disposed in the first chamber and a cold end disposed in the second chamber; when in an energized state, the hot end raises the temperature in the first chamber; and when in an energized state, the cold end lowers the temperature in the second chamber.

Further, the shell is provided with a partition plate, and the partition plate divides the accommodation space of the shell into the separate first chamber and the separate second chamber; the semiconductor structure is disposed on the partition plate.

Further, the hot end includes: a first insulation sheet; and, a heat-dissipating semiconductor unit composed of N-type semiconductors and P-type semiconductors, the heat-dissipating semiconductor unit is connected with the first insulation sheet. The cold end includes: a second insulation sheet; and, a heat-absorbing semiconductor unit composed of N-type semiconductors and P-type semiconductors; the heat-absorbing semiconductor unit is connected with the second insulation sheet. The first insulation sheet and the second insulation sheet are oppositely disposed with respect to each other; the heat-dissipating semiconductor unit and the heat-absorbing semiconductor unit are arranged between the first insulation sheet and the second insulation sheet.

Further, the heat-dissipating semiconductor unit is electrically connected with the heat-absorbing semiconductor unit, and the heat-dissipating semiconductor unit and the heat-absorbing semiconductor unit share a direct-current power supply.

Further, the apparatus further includes a cold-hot switching device for changing positive and negative electrodes of the direct-current power supply, so as to switch the cold end and the hot end of the semiconductor structure.

Further, the first insulation sheet is provided with a plurality of spaced first conductors; each first conductor is provided one P-type semiconductor and one N-type semiconductor which are spaced from each other in a first direction; the second insulation sheet is provided with a plurality of spaced second conductors; each second conductor is provided with one N-type semiconductor and one P-type semiconductor which are spaced from each other in the first direction; the apparatus further includes a plurality of third conductors disposed between the heat-dissipating semiconductor unit and the heat-absorbing semiconductor unit; semiconductors of the heat-dissipating semiconductor unit are electrically connected to same-type semiconductors of the heat-absorbing semiconductor unit by the third conductors. The N-type semiconductors and P-type semiconductors of the heat-dissipating semiconductor unit and the N-type semiconductors and P-type semiconductors of the heat-absorbing semiconductor unit are connected in series by the first conductors, the second conductors and the third conductors.

Further, the N-type semiconductors and the P-type semiconductors of the heat-dissipating semiconductor unit are mirror-symmetrical with respect to the N-type semiconductors and the P-type semiconductors of the heat-absorbing semiconductor unit; the plurality of third conductors are parallel arranged between the heat-dissipating semiconductor unit and the heat-absorbing semiconductor unit.

Further, the apparatus further includes an isolation layer provided between the hot end and the cold end for thermal insulation. The third conductors are extended through the isolation layer and located between the heat-dissipating semiconductor unit and the heat-absorbing semiconductor unit.

Further, the temperature control device further includes an air-convection device disposed in the first chamber.

Further, the air-convection device includes: an air inlet, which is to guide outside air into the first chamber and is arranged in a sidewall of the first chamber at one side adjacent to the semiconductor structure; a heat diffusion structure, which is to heat the air guided from the outside and diffuse the heated air within the first chamber; and an air outlet, which is to discharge air in the first chamber and is arranged in a sidewall of the first chamber at one side away from the semiconductor structure.

Further, the heat diffusion structure includes: a plurality of heat dissipation fins which are parallel arranged on one side of the first insulation sheet which is opposite to the side of the first insulation sheet where the heat-dissipating semiconductor unit is arranged; a fan which is to blow air towards the heat dissipation fins, so as to diffuse the heat from the hot end within the first chamber with the air entering from the air inlet and discharge the air from the air outlet; and a driving motor for driving the fan.

Further, the air-convection device includes: two air inlets; one air outlet which is arranged between the two air inlets; two fans of which each is to blow air towards the heat dissipation fins, so as to diffuse the heat from the hot end within the first chamber with the air entering from the air inlet and discharge the air from the air outlet.

Further, the first chamber is provided with a filter unit for filtering air entering from the air inlet.

Further, the filter unit includes: a grid plate which is spaced from the semiconductor structure; and a filter screen which is arranged on one side of the grid plate away from the semiconductor structure. The fan is arranged at one side of the grid plate facing the semiconductor structure.

Further, the grid plate includes: a plurality of sub-grid plates arranged in rows and columns; and valves for adjusting opening degree of the sub-grid plates.

Further, the apparatus further includes: a first temperature acquisition unit arranged in the first chamber and/or the second chamber for acquiring temperature of a corresponding chamber in real time and outputting an acquired temperature as a first temperature; and a control unit to receive the first temperature, and adjust a temperature of the cold end or hot end located in the corresponding chamber so as to adjust the temperature of the corresponding chamber when the first temperature is different form a predetermined temperature of the corresponding chamber.

Further, when the first temperature is a temperature of the first chamber and the first temperature is different from the predetermined temperature of the first chamber, the control unit adjusts the temperature in the first chamber by adjust at least one of a wind speed of the fan, opening degrees of the grid plate, an opening degree of the air inlet, and an opening degree of the air outlet.

Further, the semiconductor structure is serially connected with a controllable resistor, and the control unit adjusts the temperature of the cold end or hot end located in the corresponding chamber by adjusting resistance size of the controllable resistor.

Further, the apparatus further includes: a second temperature acquisition unit, which is connected with the semiconductor structure, is to acquire in real time the temperature of the cold end or hot end located in the corresponding chamber and output a temperature acquired by the second temperature acquisition unit as a second temperature to the control unit.

Further, each of the first chamber and the second chamber is provided with a plurality of card slots for placing liquid crystal display panels.

Beneficial effects of the present disclosure include: achieving cooling function and heating function simultaneously, improving work efficiency, high efficiency and saving energy.

DETAILED DESCRIPTION OF THE EMBODIMENTS

Structures and principles of the present disclosure will be described hereinafter in conjunction with the drawings and embodiments. The following embodiments are for illustrative purposes only, but shall not be used to limit the scope of the present disclosure.

Figure 1:
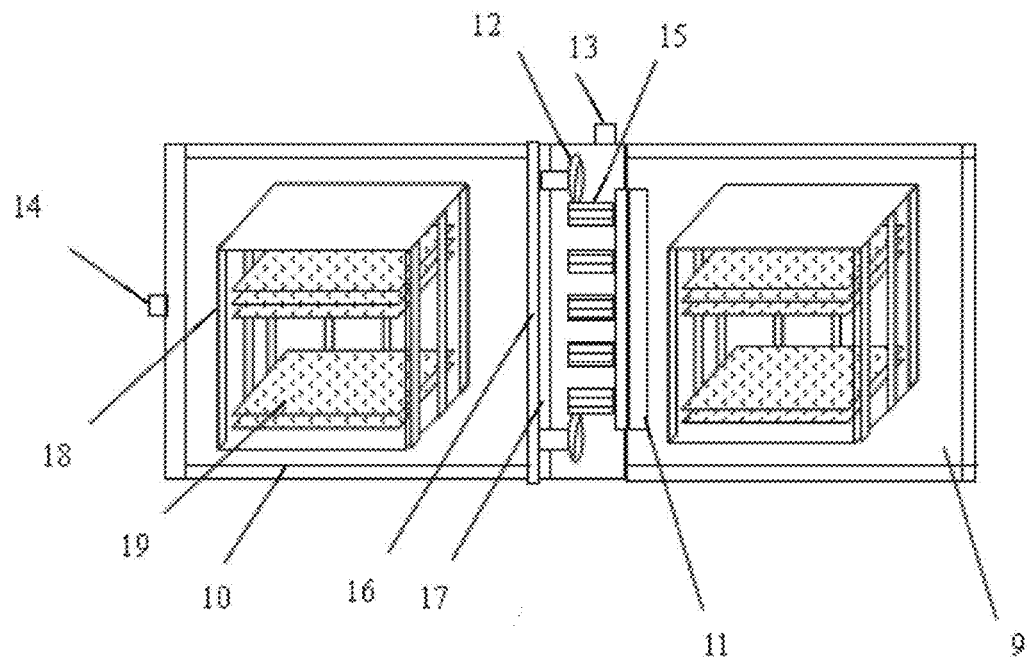
FIG. 1 is a schematic structure diagram of a liquid crystal display panel poor alignment repairing apparatus according to one embodiment of the present disclosure.
Figure 2:
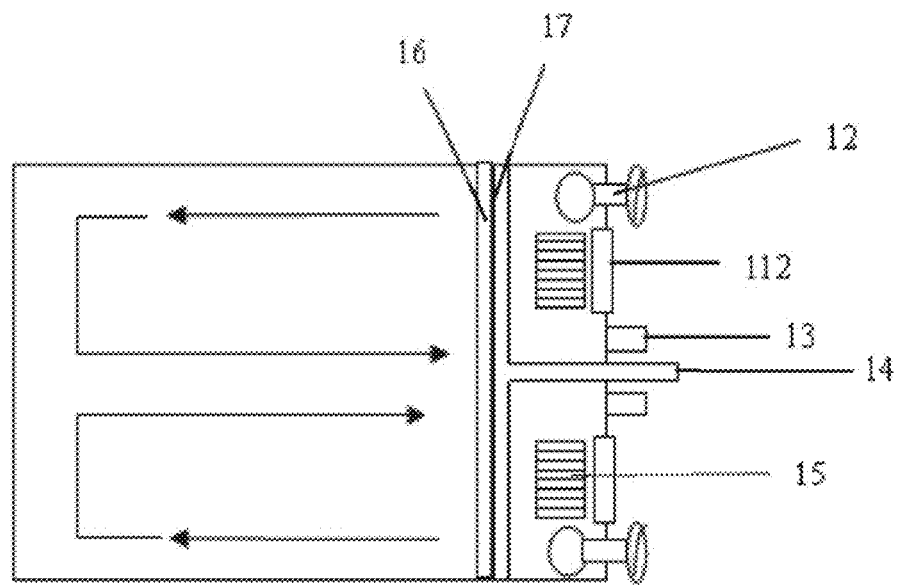
FIG. 2 is a partial structure diagram of the liquid crystal display panel poor alignment repairing apparatus according to one embodiment of the present disclosure.
Figure 3:
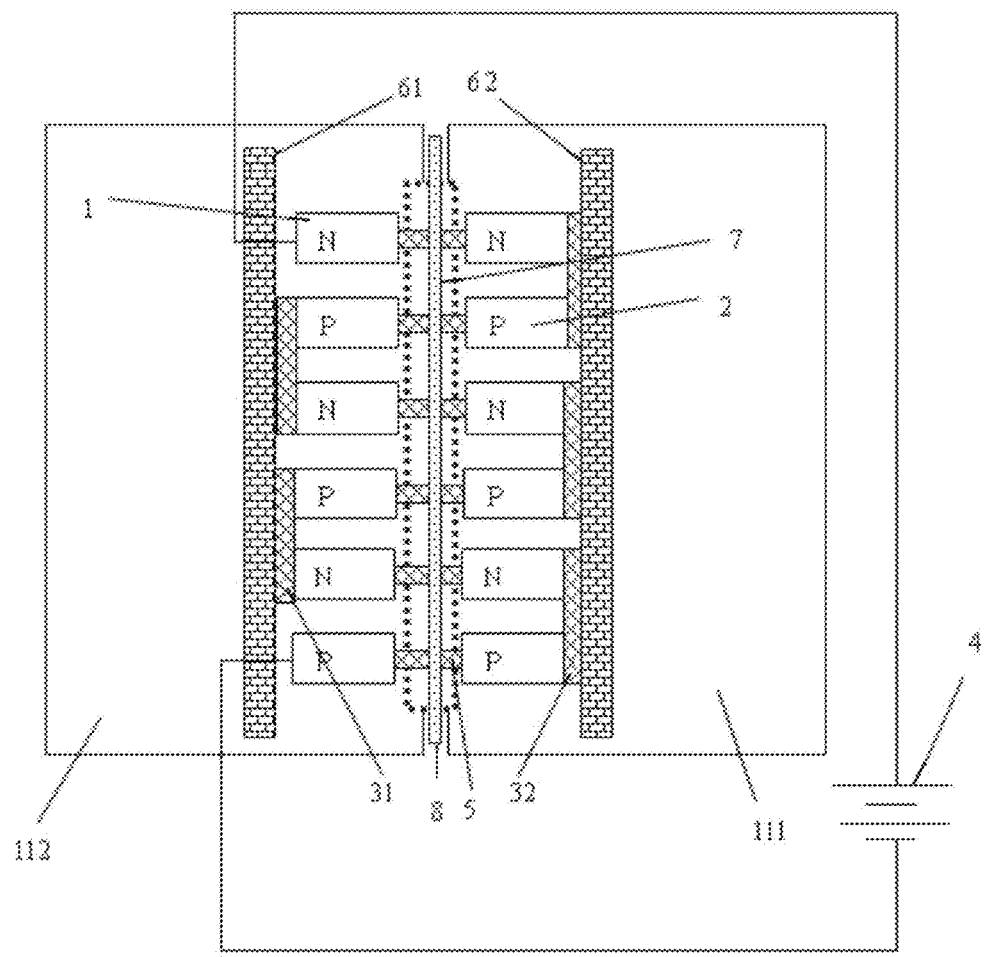
FIG. 3 is a schematic structure diagram of a semiconductor structure according to one embodiment of the present disclosure.

One embodiment of the present disclosure provides a liquid crystal display panel poor alignment repairing apparatus, for repairing a liquid crystal display panel of poor alignment. As shown in FIGS. 1-3, the liquid crystal display panel poor alignment repairing apparatus includes a shell and a temperature control device. The shell includes an accommodation space which is further divided into a separate first chamber 10 and a separate second chamber 9. The temperature control device controls temperatures in the first chamber 10 and the second chamber 9, so as to heat a to-be-repaired liquid crystal display panel in the first chamber 10, and simultaneously, cool a to-be-repaired liquid crystal display panel in the second chamber 9.

The presence of the temperature control device can realize heating and cooling simultaneously, thereby improving work efficiency, high efficiency and energy saving.

Optionally, the temperature control device includes a semiconductor structure 11 which can provide heating function and cooling function simultaneously. The semiconductor structure 11 includes a hot end 112 disposed in the first chamber 10 and a cold end 111 disposed in the second chamber 9. When in an energized state, the hot end 112 can raise the temperature in the first chamber 10. When in an energized state, the cold end 111 can lower the temperature in the second chamber 9.

Optionally, the semiconductor structure 11 is a Peltier effect sheet.

Optionally, a partition plate 8 is provided in the shell and divides the accommodation space of the shell into the separate first chamber 10 and the separate second chamber 9. The semiconductor structure 11 is disposed on the partition plate 8.

The presence of the partition plate 8 helps to arrange the semiconductor structure 11 of different sizes. According to needs, the entire Peltier effect sheet may be arranged on the partition plate 8, or the Peltier effect sheet may be arranged on the partition plate 8 with one part of the Peltier effect sheet separated from the partition plate 8. When the entire Peltier effect sheet is arranged on the partition plate 8 and the Peltier effect sheet has the same size as the partition plate 8, the Peltier effect sheet may divide the accommodation space of the shell into the separate first chamber 10 and the separate second chamber 9, and then the partition plate 8 may be omitted.

Specific structures of the semiconductor structure 11 will be described in details hereinafter.

Optionally, the hot end 112 includes a first insulation sheet 61 and a heat-dissipating semiconductor unit composed of N-type semiconductors 1 and P-type semiconductors 2. The heat-dissipating semiconductor unit is connected with the first insulation sheet 61.

Optionally, the cold end 111 includes a second insulation sheet 62 and a heat-absorbing semiconductor unit composed of N-type semiconductors 1 and P-type semiconductors 2. The heat-absorbing semiconductor unit is connected with the second insulation sheet 62.

The first insulation sheet 61 and the second insulation sheet 62 are oppositely disposed with respect to each other. The heat-dissipating semiconductor unit and the heat-absorbing semiconductor unit are arranged between the first insulation sheet 61 and the second insulation sheet 62.

Further, a plurality of spaced first conductors 31 is disposed on the first insulation sheet 61. One P-type semiconductor 2 and one N-type semiconductor 1 are disposed on each first conductor 31, and the one P-type semiconductor 2 is spaced from the one N-type semiconductor 1 along a first direction.

A plurality of spaced second conductors 32 is disposed on the second insulation sheet 62. One P-type semiconductor 2 and one N-type semiconductor 1 are disposed on each second conductor 32, and the one P-type semiconductor 2 is spaced from the one N-type semiconductor 1 along the first direction.

A plurality of third conductors 5 is disposed between the heat-dissipating semiconductor unit and the heat-absorbing semiconductor unit. Semiconductors of the heat-dissipating semiconductor unit are electrically connected to same-type semiconductors of the heat-absorbing semiconductor unit by the third conductors 5. For example, each of the N-type semiconductors of the heat-dissipating semiconductor unit is electrically connected to one corresponding N-type semiconductor of the heat-absorbing semiconductor unit by one third conductor 5; each of the P-type semiconductors of the heat-dissipating semiconductor unit is electrically connected to one corresponding P-type semiconductor of the heat-absorbing semiconductor unit by one third conductor 5.

The N-type semiconductors 1 and P-type semiconductors 2 of the heat-dissipating semiconductor unit and the N-type semiconductors 1 and P-type semiconductors 2 of the heat-absorbing semiconductor unit are connected in series by the first conductors 31, the second conductors 32 and the third conductors 5.

As shown in FIG. 3, each N-type semiconductors 1 and each P-type semiconductor 2 are arranged at a predetermined interval on one first conductor 31 on the first insulation sheet 61, thereby forming one sub-end (the first conductor 31 is equivalent to a junction) of Peltier effect sheet. Each N-type semiconductors 1 and each P-type semiconductor 2 are arranged at a predetermined interval on one second conductor 32 on the second insulation sheet 62, thereby forming one sub-end (the second conductor 32 is equivalent to a junction) of Peltier effect sheet. A plurality of spaced sub-ends is sequentially arranged at each of the first insulation sheet 61 and the second insulation sheet 62.

Among the sub-ends on the first insulation sheet 61 or the second insulation sheet 62, arrangement sequences of the N-type semiconductors 1 and the P-type semiconductors 2 on the sub-ends are identical. The arrangement sequence of the N-type semiconductor 1 and the P-type semiconductor 2 on the first conductor 31 is opposite to the arrangement sequence of the N-type semiconductor 1 and the P-type semiconductor 2 on the second conductor 32 in a first direction.

Optionally, the N-type semiconductors 1 and the P-type semiconductors 2 of the heat-dissipating semiconductor unit are mirror-symmetrical with respect to the N-type semiconductors 1 and the P-type semiconductors 2 of the heat-absorbing semiconductor unit. A plurality of third conductors 3 are parallel arranged between the heat-dissipating semiconductor unit and the heat-absorbing semiconductor unit. The third conductors 5 connect in series same type semiconductors of sub-ends on the first insulation sheet 61 and the second insulation sheet 62 which is arranged opposite to the first insulation sheet 61, so that the N-type semiconductors 1 from opposite sides are electrically connected and the P-type semiconductors 2 from opposite sides are electrically connected. That is, as shown in FIG. 3, the N-type semiconductors 1 of sub-ends of the first insulation sheet 61 are electrically to corresponding oppositely disposed N-type semiconductors 1 of sub-ends of the second insulation sheet 62; the P-type semiconductors 2 of sub-ends of the first insulation sheet 61 are electrically to corresponding oppositely disposed P-type semiconductors 2 of sub-ends of the second insulation sheet 62.

The cold end 111 and the hot end 112 each may be connected with a separate power supply, or the cold end 111 and the hot end 112 may share a power supply. In one embodiment, in order to simplify structures of the semiconductor 11 and save cost, the heat-absorbing semiconductor unit and the heat-absorbing semiconductor unit are electrically connected, and the heat-absorbing semiconductor unit and the heat-absorbing semiconductor unit share a direct-current power supply 4.

The Peltier effect sheet is powered by the direct-current power supply 4. As show in FIG. 3, the N-type semiconductor 1 at a top end portion of the first insulation sheet 61 is connected to a positive electrode of the direct-current power supply 4, and the P-type semiconductor 2 at a bottom end portion of the first insulation sheet 61 is connected to a negative electrode of the direct-current power supply 4. Between the N-type semiconductor 1 connected with the positive electrode of the direct-current power supply 4 and the P-type semiconductor 2 connected to the negative electrode of the direct-current power supply 4, a plurality of sub-ends each having one P-type semiconductor 2 being arranged above one N-type semiconductor 1 is provided on the first insulation sheet 61, and a plurality of sub-ends each having one N-type semiconductor 1 being arranged above one P-type semiconductor 2 is provided on the second insulation sheet 62. In one embodiment, before the direct-current power supply 4 is connected to the Peltier effect sheet, the direct-current power supply 4 is further serially connected with a controllable resistor (not shown in FIG. 3). The controllable resistor is to control size of current flowing though the N-type semiconductors 1 and the P-type semiconductors 2.

When the Peltier effect sheet works, the N-type semiconductor 1 has a negative thermoelectric potential due to excess electrons, and the P-type semiconductor 2 has a positive thermoelectric potential due to insufficient electrons. When electrons move from the P-type semiconductor 2 to the N-type semiconductor 1 through the junction, the temperature of the junction is lowered. The energy of the electrons is necessarily increased, and the increased energy is equivalent to the energy lost from the junction. On the contrary, when electrons move from the N-type semiconductor 1 to the P-type semiconductor 2 through the junction, the temperature of the junction rises. Heat is transferred from the cold end 111 to the hot end 112, and then the temperature of the cold end is lowered and the temperature of the hot end 112 rises.

Practice has proven that the introduction of a third kind of material such as the first conductors 31, the second conductors 32 and the third conductor 5, into the Peltier effect sheet will not change characteristics of the Peltier effect sheet. Further, it should be understood here, when the third conductors 5 serially connect the N-type semiconductors 1 and the P-type semiconductors 2, energy loss of the third conductors 5 can be reduced by such a arrangement that the N-type semiconductors 1 and the P-type semiconductors 2 of the sub-ends of the first insulation sheet 61 are mirror-symmetrical with respect to the N-type semiconductors 1 and the P-type semiconductors 2 of sub-ends of the second insulation sheet 62 which is oppositely arranged with respect to the first insulation sheet 61. Specific structures of the Peltier effect sheet may be adjusted and designed by actual needs.

In one embodiment, the first insulation sheet 61 and the second insulation sheet 62 each are made of ceramic insulation film. The ceramic insulation film has good insulation and good thermal conductivity, which helps to form insulation between the N-type semiconductors 1 and the P-type semiconductors 2 of the Peltier effect sheet, and to transfer cooling energy generated by a semiconductor cooling-heating device to the second chamber and transfer generated heating energy to the first chamber 10. The plurality of sub-ends in the second chamber 9 and the first chamber 10 are connected by the ceramic insulation films to form a whole so as to obtain desired cooling energy and heating energy. According to semiconductor refrigeration technology, heat absorption capacity and heat dissipation capacity of the Peltier effect sheet are determined by current flowing through the semiconductor material and the number of pairs of N-type semiconductor 1 and P-type semiconductor 2 which are made of semiconductor material. In one embodiment, the number of pairs of N-type semiconductor 1 and P-type semiconductor 2 can be determined according to space size of the first chamber 10 and the second chamber 9 of the poor alignment repairing apparatus and temperature range of each chamber.

Optionally, an isolation layer 7 may be provided between the hot end 112 and the cold end 111 and is used for thermal insulation. The third conductors 5 are extended through the isolation layer 7 and located between the heat-dissipating semiconductor unit and the heat-absorbing semiconductor unit.

In one embodiment, the isolation layer 7 may be alumina thermal insulation cotton having good thermal insulation effect. The third conductor 5 extends through the isolation layer 7 to electrically connect the cold end 111 to the hot end 112, so as to prevent heat from transferring between the second chamber 9 and the first chamber 10, thereby ensuring that the second chamber 9 can be cooled efficiently and the first chamber 10 can be heated efficiently.

Optionally, the liquid crystal display panel poor alignment repairing apparatus further includes a transmission device for transferring one to-be-repaired liquid crystal display panel which has been heated in the first chamber 10 to the second chamber 9.

Optionally, the liquid crystal display panel poor alignment repairing apparatus further includes a cold-hot switching device for changing positive and negative electrodes of the direct-current power supply 4, so as to switch the cold end 111 and the hot end 112 of the semiconductor structure 11.

The presence of the cold-hot switching device can omit the transmission process and then omit the transmission device. Thus, it is able to reduce heat loss of the to-be-repaired liquid crystal display panel which has been heated during the transmission process, thereby improving repairing efficiency and quality.

The presence of the cold-hot switching device can provide cooling function and heating function for each of the separated disposed first chamber 10 and the separated disposed second chamber 9. That is to cool the first chamber 10 and heat the second chamber 9, or heat the first chamber 10 and cool the second chamber 9. According to Peltier effect principle, when a direction of the direct current flowing through the Peltier effect sheet is changed, the heat dissipation and the heat adsorption at the junction (i.e., the first conductor 31, the second conductor 32 of the sub-end of the embodiment) is reversible, that is, the junction for heat dissipation and the junction for heat adsorption are exchanged accordingly. The adsorbed heat and the dissipated heat are proportional to the size of the direct current I flowing through a circuit.

As shown in FIG. 3, in one embodiment, at the first insulation sheet 61, when current flows from the P-type semiconductor 2 to the N-type semiconductor 1, the junction i.e., the first conductor 31 therebetween is a heating sub-end. The plurality of heating sub-ends at the first insulation sheet 61 defines the hot end 112. Since the hot end 112 is disposed in the first chamber 10, thus, the first chamber 10 is heated by the hot end, and then the first chamber 10 is a heating chamber. Accordingly, at the second insulation sheet 62, when current flows from the N-type semiconductor 1 to the P-type semiconductor 2, the junction i.e., the second conductor 32 therebetween is a cooling sub-end. The plurality of cooling sub-ends at the second insulation sheet 62 defines the cold end 111. Since the cold end 111 is disposed in the second chamber 9, thus, the second chamber 9 is cooled by the cold end, and then the second chamber 9 is a cooling chamber. When changing the direction of the direct current flowing through the Peltier effect sheet, the functions of the first chamber 10 and the second chamber 9 are exchanged, that is, the first chamber 10 is a cooling chamber, and the second chamber 9 is a heating chamber.

Optionally, in order to ensure the temperature required in the first chamber 10 and uniformity of dissipated heat in the first chamber 10, the temperature control device further includes an air-convection device disposed in the first chamber 10.

Further, the air-convection device includes an air inlet 13, a heat diffusion structure and air outlet 14. The air inlet 13 is to guide outside air into the first chamber. The air inlet 13 is arranged in a sidewall of the first chamber 10 at one side adjacent to the semiconductor structure 11. The heat diffusion structure is to heat the air guided from the outside and diffuse the heated air within the first chamber 10. The air outlet 14 is to discharge air in the first chamber 10. The air outlet 14 is arranged in a sidewall of the first chamber 10 at one side away from the semiconductor structure 11.

Further, the heat diffusion structure includes a plurality of heat dissipation fins 15, a fan 12 and a driving motor for driving the fan 12. The plurality of heat dissipation fins 15 is parallel arranged on one side of the first insulation sheet 61 which is opposite to the side of the first insulation sheet 61 where the heat-dissipating semiconductor unit is arranged. The fan 12 blows air towards the heat dissipation fins 15, so as to diffuse the heat from the hot end 112 within the first chamber 10 with the air entering from the air inlet 13. The air is discharged from the air outlet 14.

The air-convection device may be divided into a single circulation type and a double circulation type according to movement direction of heat in the first chamber 10. The poor alignment repairing apparatus shown in FIG. 1 adopts the single circulation type. In the single circulation type, one air inlet 13 and one outlet 14 may be provided. The air inlet 13 is further provided with an air-inlet valve (not shown in FIG. 1). The air outlet 14 is further provided with an air-outlet valve (not shown in FIG. 1). The air inlet 13 with corresponding air-inlet valve and the air outlet 14 with corresponding air-outlet valve are provided at different sidewalls of the first chamber 10.

In short, when adopting the single circulation type, air enters through the air inlet 13, and then is heated by the heat dissipation metal fins 15 arranged at the hot end 112 when flowing through the heat dissipation metal fins 15 arranged at the hot end 112. The heated air is blown into the first chamber 10 by the fan 12, and is finally discharged from the air outlet 14. The presence of the air-convection device can transfer away heat generated at the hot end 112 quickly, which helps to heat the first chamber quickly and ensure cooling effect of the cold end 111.

Optionally, as shown in FIG. 2, in some embodiments, in order to effectively ensure stability of the temperature in the first chamber 10 and uniformity of heat in the first chamber 10, the movement direction of air in the first chamber 10 may adopt double circulation mode. Specifically, the air-convection device includes two air inlets 13, one air outlet 14 and two fans 12. The two air inlets 13 each are provided with an air-inlet valve (not shown). The air outlet 14 is arranged between the two air inlets 13. The air outlet 14 is provided with an air-outlet valve (not shown). Each fan 12 blows air towards the heat dissipation fins 15, so as to diffuse the heat from the hot end 112 within the first chamber 10 with the air entering from the air inlet 13. The air is discharged from the air outlet 14.

The two air inlets 13 with the corresponding air-inlet valves and the air outlet 14 with the corresponding air-outlet valve are arranged in a same sidewall of the first chamber 10. Optionally, one air inlet 13 is arranged at two sides of the air outlet 14, respectively. In this way, air entering from the air inlets 13 is heated and is blown by the two fans 12 into the first chamber 10 to form two airstreams. The two airstreams circulate in the first chamber 10 and then are discharged out of the heating chamber through the air outlet.

Optionally, since air outside of the shell is introduced as heat transmission medium, thus, in order to ensure cleanliness of the first chamber 10, a filter unit is provided in the first chamber 10 for filtering air entering from the air inlet 13.

Further, the filter unit includes a filter screen 16 and a grid plate 17 which is spaced from the semiconductor structure 11. The fan 12 is arranged at one side of the grid plate 17 facing towards the semiconductor structure 11. The filter screen 16 is arranged on one side of the grid plate 17 away from the semiconductor structure 11.

Further, the grid plate 17 includes a plurality of sub-grid plates arranged in rows and columns, and valves for adjusting opening degree of the sub-grid plates.

The grid plate 17 is parallel to and spaced from the partition plate 8. The fans 12 are disposed one side of the grid plate 17 facing the partition plate 8. The filter screen 16 is abuts the grid plate 17. As shown in FIGS. 6-10, the grid plate 17 includes a frame 170, and a plurality of sub-grid plates 174 pivotally installed in the frame 170 via pivots 172. The sub-grid plates 174 are arranged in rows and columns. The sub-grid plate 174 is provided with a valve 176 for controlling opening degree of the sub-grid plates. By adjusting the valve 176, the grid plate 17 may form a plate without hollow portions when the valves 176 are completely closed. When the valves 176 are not completely closed, the grid plate 17 may form a grid structure including a plurality of hollow portions with adjustable sizes. The filter screen 16 includes a plurality of grids arranged in rows and columns at intervals. The grid plate 17 and the filter screen 16 cooperate to adjust volume of outside air entering into the first chamber 10, and efficiently block impurity in the outside air from entering into the first chamber 10.

Further, a plurality of card slots is disposed in each of the first chamber 10 and the second chamber 9 for placing liquid crystal display panels 19.

The card slot 18 is to clamp a plate-type component. In one embodiment, the card slots 18 are mainly to clamp liquid crystal display panels 19, so as to facilitate simultaneously cooling or heating several liquid crystal display panels 19. The filter screen 16 and the grid plate 17 may be arranged between the card slot 18 and the heat diffusion structure.

Optionally, in order to achieve automatic control of the temperatures in the first chamber 10 and the second chamber 9, the liquid crystal display panel poor alignment repairing apparatus further includes: a first temperature acquisition unit arranged in the first chamber 10 and/or the second chamber 9 for acquiring temperature of a corresponding chamber in real time and outputting the acquired temperature as a first temperature; a control unit to receive the first temperature, and adjust a temperature of the cold end 111 or hot end 112 located in the corresponding chamber so as to adjust the temperature of the corresponding chamber when the first temperature is different form a predetermined temperature of the corresponding chamber.

Further, when the first temperature is the temperature of the first chamber 10 and the first temperature is different from a predetermined temperature of the first chamber 10, the control unit adjusts the temperature in the first chamber 10 by adjust at least one of a speed of the fan 12, opening degrees of the grid plate 17, an opening degree of the air inlet 13, and an opening degree of the air outlet 14.

Further, the semiconductor structure 11 is serially connected with the controllable resistor, and the control unit adjusts the temperature of the cold end 111 or hot end 112 located in the corresponding chamber by adjusting resistance size of the controllable resistor.

Further, the liquid crystal display panel poor alignment repairing apparatus further includes a second temperature acquisition unit connected with the semiconductor structure 11. The second temperature acquisition unit is to acquire in real time the temperature of the cold end 111 or hot end 112 located in the corresponding chamber, and output the acquired temperature as a second temperature to the control unit.

Figure 4:
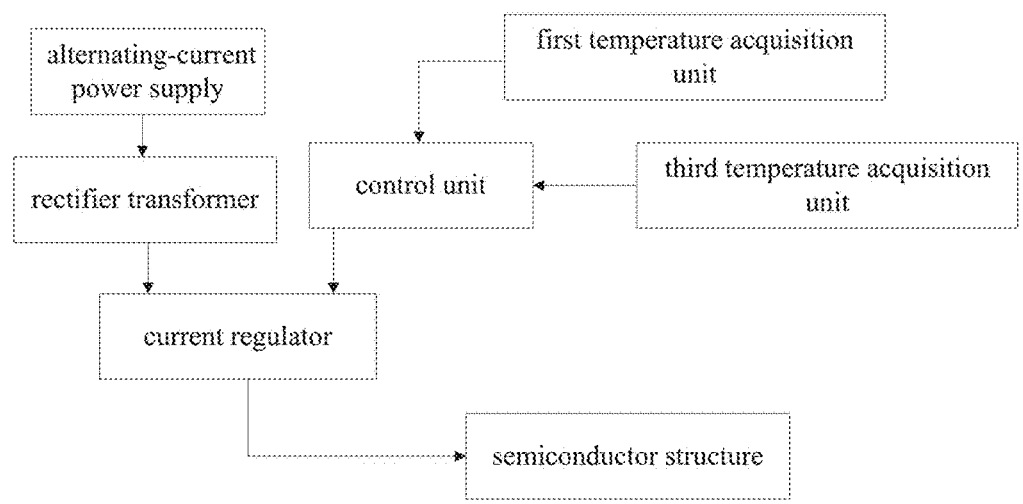
FIG. 4 is a schematic diagram showing controlling of temperature in a second chamber according to one embodiment of the present disclosure.
Figure 5:
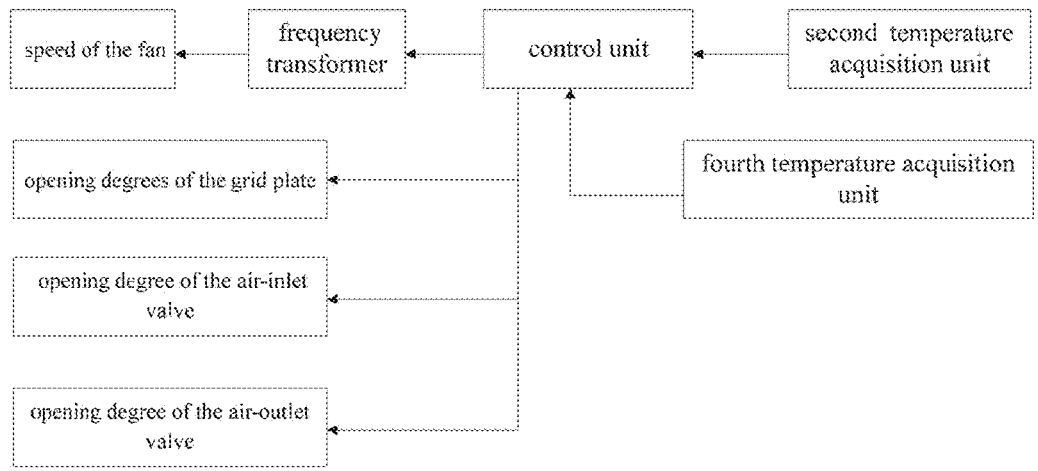
FIG. 5 is a schematic diagram showing controlling of temperature in a first chamber according to one embodiment of the present disclosure.
Figure 6:
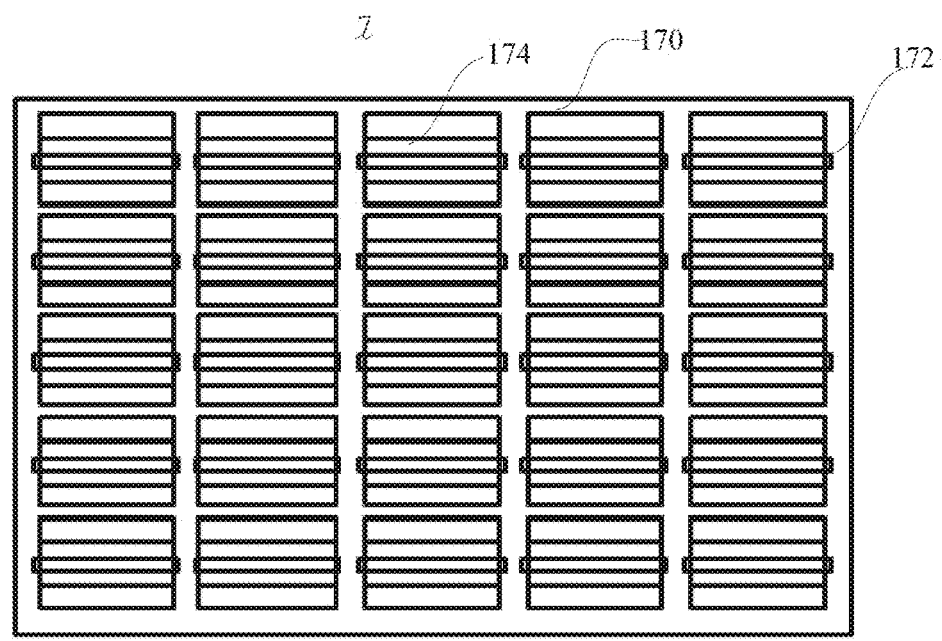
FIG. 6 is a schematic structure diagram of a grid plate with sub-grid plates half-opened according to one embodiment of the present disclosure.
Figure 7:
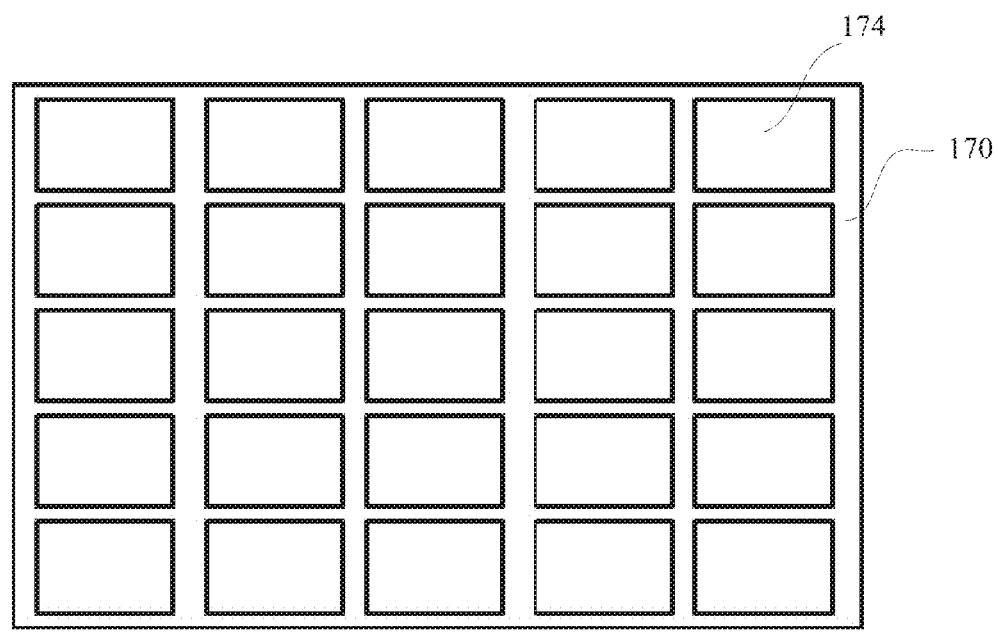
FIG. 7 is a schematic structure diagram of the grid plate with the sub-grid plates closed according to one embodiment of the present disclosure.
Figure 8:
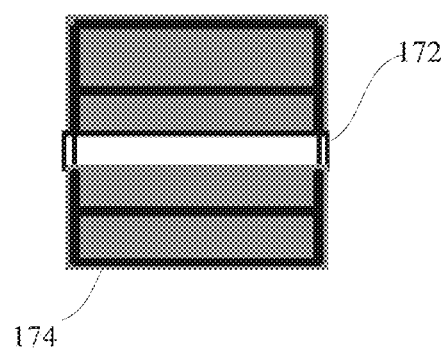
FIG. 8 is a schematic structure diagram of one sub-grid plate shown in FIG. 6.
Figure 9:
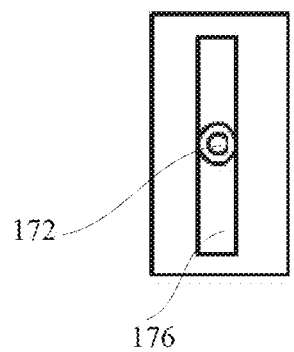
FIG. 9 is a lateral view of the sub-grid plate shown in FIG. 8, where the sub-grid plate is in a closed state.
Figure 10:
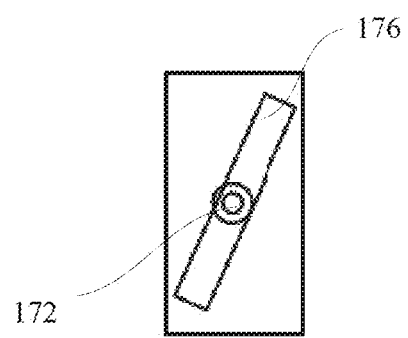
FIG. 10 is a lateral view of the sub-grid plate shown in FIG. 8, where the sub-grid plate is in a half-opened state.

As shown in FIGS. 4-5, in one embodiment, the control unit may be a programmable logic controller (PLC); the first temperature acquisition unit and the second temperature acquisition unit each may be temperature sensor. Specifically, a cooling temperature of the second chamber 9 is sensed by a temperature sensor Sa of the first temperature acquisition unit, and is recorded as a temperature Ta. A heating temperature of the first chamber 10 is sensed by a temperature sensor Sb of the second temperature acquisition unit, and is recorded as a temperature Tb. The temperature of the cold end 111 of the Peltier effect sheet, i.e., the semiconductor cooling-heating device, is sensed by a temperature sensor Sc of a third temperature acquisition unit, and is recorded as a temperature Tc. The temperature of the hot end 112 of the Peltier effect sheet, i.e., the semiconductor cooling-heating device, is sensed by a temperature sensor Sd of a fourth temperature acquisition unit, and is recorded as a temperature Td. The temperatures Ta, Tb, Tc and Td are transmitted to the programmable logic controller. The programmable logic controller adjusts the controllable resistor and controls operation of the air-convection device, so as to achieve accurate control of temperature accuracy, heating rate and cooling rate of the first chamber 10 and the second chamber 9 in the liquid crystal display panel poor alignment repairing apparatus. Thus, the liquid crystal display panel poor alignment repairing apparatus is energy-saving and efficient.

In the liquid crystal display panel poor alignment repairing apparatus, the controllable resistor is powered by the direct-current power supply 4, when other conditions remain unchanged, heat-absorbing power or heat-dissipating power of the Peltier effect sheet is proportional to the size of the direct current I flowing through the controllable resistor. Thus, adjustment of size of the direct-current power supply 4 which supplies power for the controllable resistor, can simply adjust the heat absorption capacity and heat dissipation capacity of the Peltier effect sheet. As shown in FIG. 4, in one embodiment, the adjustment process of the direct-current power supply 4 includes: converting an alternating-current power supply to the direct-current power supply 4 through a rectifier transformer, and enabling a current regulator to output a desired current for the Peltier effect sheet according to a judging result of the control unit, so as to cool the second chamber 9 to the desired temperature.

As shown in FIG. 5, operation of the air-convection device disposed in the first chamber 10 refers to at least one of the following factors: air volume and wind speed of the fan 12, opening degrees of the grid plate 17, opening degree of the air-inlet valve, opening degree of the air-outlet valve, etc. Specifically, when the temperature Tb in the first chamber 10 is lower than a predetermined temperature stored in advance, and the temperature Td is greater than the temperature Tb, one or more of the following steps is performed: accelerating the wind speed of the fan 12, or increasing the opening degrees of the grid plate 17, or increasing the opening degree of the air-inlet valve, or reducing the opening degree of the air-outlet valve. On the contrary, when the temperature Tb in the first chamber 10 is greater than the predetermined temperature stored in advance, one or more of the following steps is performed: reducing the wind speed of the fan 12, or reducing the opening degrees of the grid plate 17, or reducing the opening degree of the air-inlet valve, or increasing the opening degree of the air-outlet valve. Here, the wind speed of the fan 12 is controlled by frequency of the motor which drives the fan 12, for example, the frequency of the motor may be controlled by a frequency transformer. Meanwhile, it is necessary to monitor a plurality of control variables such as the opening degree of the air-inlet valve, the opening degree of the air-outlet valve, the opening degree of the grid plate 17 and the wind speed of the fan 12 (or, the frequency of the motor which drives the fan 12). It is known in the related art to monitor these control variables, and will not be repeated here.

Generally, when repairing the poor alignment, the cooling temperature of the second chamber 9 is required to be in a range of 0□ to 20□, the heating temperature of the first chamber 10 is required to be in a range of 80□ to 100□. In the poor alignment repairing apparatus of one embodiment, the Peltier effect sheet enables the cooling temperature of the second chamber 9 to be in a range of 0□ to 25□; with the help of the air-convection device, heat can be quickly diffused in the first chamber 10 so that the temperature in the first chamber 10 can be in a range of 80□ to 100□. Since the heat can be quickly diffused in the first chamber 10, thus, it is able to effectively prevent overheating of the Peltier effect sheet. Thus, the Peltier effect sheet can satisfy both of high temperature requirement and low temperature requirement required when repairing poor alignment of liquid crystal display panel, and the Peltier effect sheet can withstand the load.

The temperatures of the first chamber 10 and the second chamber 9 can be acquired automatically or manually. In some embodiments, the poor alignment repairing apparatus does not include the temperature acquisition unit, i.e., not includes the temperature sensors Sa, Sb, Sc and Sd.

In one embodiment, in order to acquire the temperature of the first chamber 10 and/or the second chamber 9, a worker may use a handheld thermometer to measure the temperature of the first chamber 10 and/or the second chamber 9, or the worker may observe a thermometer which is disposed in the first chamber 10 and/or the second chamber 9 in advance.

In sum, the poor alignment repairing apparatus of the present disclosure has following advantages: (1) having a small size, saving clean room space, and eliminating the need for carrying or transferring liquid crystal display panels; (2) without the use of refrigerant, no noise pollution, and no refrigerant pollution; (3) high efficiency, saving energy, small inertia, quickly cooling, quickly heating, good heat dissipation at the hot end 112, quickly achieving the maximum temperature difference when the cold end 111 having no load, and good uniform of heat in the first chamber 10; (4) the cooling capacity of the Peltier effect sheet capable of being adjusted by adjusting size of work current, reliable, long service life, easy to control, and easy to adjust.

Since the clean room usually provides a constant temperature and humidity environment and the Peltier effect sheet can simultaneously provide cooling function and heating function, thus, the Peltier effect sheet can cool the second chamber 9 so as to achieve low temperature test of liquid crystal panels, and heat generated by the Peltier effect sheet can be transferred to the first chamber 10 via the air-convection device so as to achieve high temperature test of liquid crystal panels. Therefore, there is no temperature exchange between the poor alignment repairing apparatus and the environment where the poor alignment repairing apparatus exists, and this helps to keep the requirements of constant temperature and humidity environment for the clean room.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A liquid crystal display panel poor alignment repairing apparatus, comprising:

a shell comprising an accommodation space which comprises a separate first chamber and a separate second chamber; and a temperature control device, which is to control temperatures in the first chamber and the second chamber in such a manner of heating a to-be-repaired liquid crystal display panel in the first chamber and simultaneously cooling a to-be-repaired liquid crystal display panel in the second chamber.

2. The apparatus of claim 1, wherein the temperature control device comprises a semiconductor structure which provides heating function and cooling function simultaneously; the semiconductor structure comprises a hot end disposed in the first chamber and a cold end disposed in the second chamber; when in an energized state, the hot end raises the temperature in the first chamber; and when in an energized state, the cold end lowers the temperature in the second chamber.

3. The apparatus of claim 2, wherein the shell is provided with a partition plate; the partition plate divides the accommodation space of the shell into the separate first chamber and the separate second chamber; the semiconductor structure is disposed on the partition plate.

4. The apparatus of claim 2, wherein the hot end comprises:
a first insulation sheet; and
a heat-dissipating semiconductor unit composed of N-type semiconductors and P-type semiconductors, wherein the heat-dissipating semiconductor unit is connected with the first insulation sheet;
the cold end comprises:
a second insulation sheet; and
a heat-absorbing semiconductor unit composed of N-type semiconductors and P-type semiconductors; wherein the heat-absorbing semiconductor unit is connected with the second insulation sheet;
wherein the first insulation sheet and the second insulation sheet are oppositely disposed with respect to each other; the heat-dissipating semiconductor unit and the heat-absorbing semiconductor unit are arranged between the first insulation sheet and the second insulation sheet.

5. The apparatus of claim 4, wherein the heat-dissipating semiconductor unit is electrically connected with the heat-absorbing semiconductor unit, and the heat-dissipating semiconductor unit and the heat-absorbing semiconductor unit share a direct-current power supply.

6. The apparatus of claim 5, further comprising a cold-hot switching device for changing positive and negative electrodes of the direct-current power supply, so as to switch the cold end and the hot end of the semiconductor structure.

7. The apparatus of claim 5, wherein the first insulation sheet is provided with a plurality of spaced first conductors; each first conductor is provided one P-type semiconductor and one N-type semiconductor which are spaced from each other in a first direction;
the second insulation sheet is provided with a plurality of spaced second conductors; each second conductor is provided with one N-type semiconductor and one P-type semiconductor which are spaced from each other in the first direction;
the apparatus further comprises a plurality of third conductors disposed between the heat-dissipating semiconductor unit and the heat-absorbing semiconductor unit; semiconductors of the heat-dissipating semiconductor unit are electrically connected to same-type semiconductors of the heat-absorbing semiconductor unit by the third conductors;
wherein the N-type semiconductors and P-type semiconductors of the heat-dissipating semiconductor unit and the N-type semiconductors and P-type semiconductors of the heat-absorbing semiconductor unit are connected in series by the first conductors, the second conductors and the third conductors.

8. The apparatus of claim 7, wherein the N-type semiconductors and the P-type semiconductors of the heat-dissipating semiconductor unit are mirror-symmetrical with respect to the N-type semiconductors and the P-type semiconductors of the heat-absorbing semiconductor unit; the plurality of third conductors are parallel arranged between the heat-dissipating semiconductor unit and the heat-absorbing semiconductor unit.

9. The apparatus of claim 7, further comprising an isolation layer provided between the hot end and the cold end for thermal insulation; wherein the third conductors are extended through the isolation layer and located between the heat-dissipating semiconductor unit and the heat-absorbing semiconductor unit.

10. The apparatus of claim 5, wherein the temperature control device further comprises an air-convection device disposed in the first chamber.

11. The apparatus of claim 10, wherein the air-convection device comprises:
an air inlet, which is to guide outside air into the first chamber and is arranged in a sidewall of the first chamber at one side adjacent to the semiconductor structure;
a heat diffusion structure, which is to heat the air guided from the outside and diffuse the heated air within the first chamber; and
an air outlet, which is to discharge air in the first chamber and is arranged in a sidewall of the first chamber at one side away from the semiconductor structure.

12. The apparatus of claim 11, wherein the heat diffusion structure comprises:
a plurality of heat dissipation fins which are parallel arranged on one side of the first insulation sheet which is opposite to the side of the first insulation sheet where the heat-dissipating semiconductor unit is arranged;
a fan which is to blow air towards the heat dissipation fins, so as to diffuse the heat from the hot end within the first chamber with the air entering from the air inlet and discharge the air from the air outlet; and
a driving motor for driving the fan.

13. The apparatus of claim 12, wherein the air-convection device comprises:
two air inlets;
one air outlet which is arranged between the two air inlets;
two fans of which each is to blow air towards the heat dissipation fins, so as to diffuse the heat from the hot end within the first chamber with the air entering from the air inlet and discharge the air from the air outlet.

14. The apparatus of claim 12, wherein the first chamber is provided with a filter unit for filtering air entering from the air inlet.

15. The apparatus of claim 14, wherein the filter unit comprises:
a grid plate which is spaced from the semiconductor structure; and
a filter screen which is arranged on one side of the grid plate away from the semiconductor structure;

wherein the fan is arranged at one side of the grid plate facing the semiconductor structure.

16. The apparatus of claim 15, wherein the grid plate comprises:
a plurality of sub-grid plates arranged in rows and columns; and
valves for adjusting opening degrees of the sub-grid plates.

17. The apparatus of claim 16, further comprising:
a first temperature acquisition unit arranged in the first chamber and/or the second chamber for acquiring temperature of a corresponding chamber in real time and outputting an acquired temperature as a first temperature; and
a control unit to receive the first temperature, and adjust a temperature of the cold end or hot end located in the corresponding chamber so as to adjust the temperature of the corresponding chamber when the first temperature is different form a predetermined temperature of the corresponding chamber;
wherein when the first temperature is a temperature of the first chamber and the first temperature is different from the predetermined temperature of the first chamber, the control unit adjusts the temperature in the first chamber by adjust at least one of a wind speed of the fan, opening degrees of the grid plate, an opening degree of the air inlet, and an opening degree of the air outlet.

18. The apparatus of claim 17, wherein the semiconductor structure is serially connected with a controllable resistor, and the control unit adjusts the temperature of the cold end or hot end located in the corresponding chamber by adjusting resistance size of the controllable resistor.

19. The apparatus of claim 18, further comprises:
a second temperature acquisition unit, which is connected with the semiconductor structure, is to acquire in real time the temperature of the cold end or hot end located in the corresponding chamber and output a temperature acquired by the second temperature acquisition unit as a second temperature to the control unit.

20. The apparatus of claim 1, wherein each of the first chamber and the second chamber is provided with a plurality of card slots for placing liquid crystal display panels.

* * * * *